United States Patent
Muraoka et al.

(10) Patent No.: US 6,294,268 B1
(45) Date of Patent: *Sep. 25, 2001

(54) MULTILAYERED LAMINATE CONTAINING ULTRAHIGH MOLECULAR WEIGHT POLYOLEFIN LAYER, PROCESS FOR PRODUCING THE SAME, AND APPARATUS FOR PRODUCING THE MULTILAYERED LAMINATE

(75) Inventors: Kyoji Muraoka; Iwatoshi Suzuki; Toshimasa Takata, all of Yamaguchi-ken (JP)

(73) Assignee: Mitsui Chemicals, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/194,675

(22) PCT Filed: Mar. 26, 1998

(86) PCT No.: PCT/JP98/01363
  § 371 Date: Nov. 30, 1998
  § 102(e) Date: Nov. 30, 1998

(87) PCT Pub. No.: WO98/43812
  PCT Pub. Date: Oct. 8, 1998

(30) Foreign Application Priority Data

Mar. 31, 1997 (JP) ............................................ 9-80066
Apr. 30, 1997 (JP) ........................................... 9-112931

(51) Int. Cl.$^7$ .............................. B32B 27/08; B29C 45/14
(52) U.S. Cl. ........................ 428/515; 428/500; 428/516; 425/133.1; 425/381; 264/515; 264/516
(58) Field of Search .................................. 264/514, 515; 428/500, 515, 516; 425/381, 133.1

(56) References Cited

U.S. PATENT DOCUMENTS

| 5,156,857 | * | 10/1992 | Wang et al. ........................ 425/130 |
| 5,445,883 | * | 8/1995 | Kobayashi et al. .................. 428/355 |
| 6,007,760 | * | 12/1999 | Shiraki et al. ...................... 425/381 |

FOREIGN PATENT DOCUMENTS

| 0472436A2 | 2/1992 | (EP) . |
| 0771640A1 | 5/1997 | (EP) . |
| 58-108138 | 6/1983 | (JP) . |
| 60-101021 | 6/1985 | (JP) . |
| 61-290027 | 12/1986 | (JP) . |
| 03-205151 | 9/1991 | (JP) . |
| 08-174658 | 7/1996 | (JP) . |

\* cited by examiner

Primary Examiner—Paul Thibodeau
Assistant Examiner—Monique R Jackson
(74) Attorney, Agent, or Firm—Birch, Stewart, Kolasch & Birch, LLP

(57) ABSTRACT

The present invention relates to a multi-layer laminate comprising at least two layers of an oriented ultra-high molecular polyolefin layer and a thermoplastic resin layer. The multi-layer laminate exhibits excellent abrasion resistance, tensile strength, shock resistance, heat-sealing property, uniformity in the film thickness, and can be efficiently produced. The invention is further concerned with a process and an apparatus for producing the multi-layer laminate.

18 Claims, 3 Drawing Sheets

MULTILAYERED LAMINATE CONTAINING ULTRAHIGH MOLECULAR WEIGHT POLYOLEFIN LAYER, PROCESS FOR PRODUCING THE SAME, AND APPARATUS FOR PRODUCING THE MULTILAYERED LAMINATE

This application is the national phase under 35 U.S.C. §371 of prior PCT International Application No. PCT/JP98/01363 which has an International filing date of Mar. 26, 1998 which designated the United States of America, the entire contents of which are hereby incorporated by reference.

TECHNICAL FIELD

The present invention relates to a multi-layer laminate comprising an oriented ultra-high molecular weight polyolefin layer and a thermoplastic resin layer. More specifically, the invention relates to a multi-layer laminate constituted basically by at least an oriented ultra-high molecular weight polyolefin layer and a thermoplastic resin layer, exhibiting excellent abrasion resistance, tensile strength, shock resistance, heat-sealing property, uniformity in the film thickness, and that can be efficiently produced.

The invention is further concerned with a process and an apparatus for producing the multi-layer laminate maintaining good productivity.

BACKGROUND ART

Ultra-high molecular weight polyolefins exhibit excellent shock resistance, abrasion resistance, resistance against chemicals, tensile strength and the like properties compared to those of general-purpose polyolefins, and are finding spreading applications as engineering resins. However, products having decreased thicknesses obtained by using ultra-high molecular weight polyolefins exhibit inferior secondary machinability such as heat-sealing property to those of the general-purpose polyolefins.

In order to improve such a problem of the ultra-high molecular weight polyolefins, it has been attempted to laminate a layer of a thermoplastic resin having good heat-sealing property.

For example, Japanese Patent Publication No. 108138/1983 discloses a process for producing an inflation film by using a generally used extruder in order to obtain a laminate of a high molecular weight polyolefin. According to this publication, a film is formed by using a material having a weight average molecular weight of from 800,000 to 1,500,000 and a melt flow index (MFR) of from 0.03 to 0.1. Relying upon this method, however, it is difficult to laminate an ultra-high molecular polyolefin having an MFR of smaller than 0.03 and a limiting viscosity [η] of not smaller than 5 dl/g on other polymer.

The present applicant has previously proposed a process for producing an inflation film by using a tube die of which the mandrel revolves accompanying the revolution of the screw of an extruder, in order to obtain, from an ultra-high molecular weight polyolefin alone, a formed article in which the decreasing of the molecular weight is suppressed to be as low as possible (Japanese Patent Publication No. 55433/1994).

According to this process, however, the tubular film that is extruded faces sideways arousing a problem in that the upper portion of the tubular film becomes thin, the lower portion thereof becomes thick, developing a difference in the thickness between the upper portion and the lower portion. In order to increase the rate of production, furthermore, the revolving speed of the mandrel must be increased accompanying the revolution of the screw, giving rise to the occurrence of a problem in that the resin is deteriorated due to the friction. There further remains a problem in that the mandrel must be lengthened in order to eliminate flight marks on the resin.

In order to produce a laminate of an ultra-high molecular polyolefin, it has also been attempted to laminate other materials by using a skived film obtained by skiving a molded article of the ultra-high molecular weight polyolefin (Japanese Laid-Open Patent Publication No. 173505/1996). In a step of obtaining a skived film by using a blade, however, vertical streaks formed by the blade tip causes the surface to become rugged. Therefore, a laminate of the skived film and other resins still fails to give a satisfactory result when it is used for a variety of applications. Furthermore, limitation is imposed on the width and length of the laminate that is obtained, which is not favorable even from the standpoint of productivity.

Referring to the laminate of a skived film of an ultra-high molecular polyolefin and other resins disclosed in the above Japanese Laid-Open Patent Publication No. 173505/1996, the ultra-high molecular polyolefin layer constituting the laminate has not been oriented. This is because, the cylindrical molded article which will be skived to obtain a skived film is obtained by heat-melting the ultra-high molecular polyolefin.

There can also be quoted a method of producing a multi-layer laminate in which the individual layers are oriented, by laminating a single oriented film of an ultra-high molecular polyolefin and an oriented thermoplastic resin film under the application of a pressure between a pair of rollers heated at a predetermined temperature. In the multi-layer laminate obtained according to this method, however, the resins constituting the individual layers are once melted and, then, adhered in an interface where the layers are to be adhered together, and, hence, become amorphous. Therefore, the multi-layer laminate obtained according to this method is different from the multi-layer laminate of the present invention.

Furthermore, when it is attempted to laminate an ultra-high molecular polyolefin on another material, use of a skived film imposes limitation on the width. Therefore, limitation is imposed on the coating width and on the length. Despite it is attempted to continuously produce a laminate with another material, therefore, limitation is imposed by the length of the skived film, and the roll must be replaced every after the end of the roll of the skived film, causing inconvenience from the standpoint of production.

In trying to improve abrasion resistance on the surface of the pipe by adhering such a laminate on the cylindrical surfaces of a polyolefin pipe or a metal pipe, no seam is formed on the surfaces of the pipe by an ultra-high molecular polyolefin multi-layer laminate if a tubular laminate could be stuck to the polyolefin pipe or to the metal pipe, which is very effective from the standpoint of coating and productivity. So far, however, there was available no ultra-high molecular polyolefin multi-layer laminate tube in which the ultra-high molecular polyolefin layer has a molecular weight greater than a predetermined value and the whole laminate exhibits excellent mechanical strength.

It has therefore been desired to provide a multi-layer laminate which includes an ultra-high molecular polyolefin layer on which less limitation is imposed, exhibiting excellent mechanical properties such as tensile strength, film shock resistance, etc.

It is further considered that the ultra-high molecular polyolefin that is stuck on a metal plate can be used for the applications where strength and surface abrasion resistance are required, such as industrial conveyer lines. When used for such applications, however, the laminate poorly adheres and is not practically utilizable unless it adheres to the metal plate or to the metal foil at a low temperature maintaining a large strength. When it is attempted to adhere the laminate at a high temperature, furthermore, the laminate of the ultra-high molecular polyolefin and the metal plate is warped. In addition, when used as an industrial conveyer line, the surfaces of the line are broken in short periods of time and durability is not maintained for extended periods of time unless the multi-layer laminate stuck to the metal plate has a sufficiently large strength.

It has therefore been desired to provide a multi-layer laminate including an ultra-high molecular weight polyolefin that can be adhered to the metals, exhibiting a sufficiently large adhesion strength at low temperatures and excellent mechanical strength.

It has further been desired to produce such a multi-layer laminate efficiently.

DISCLOSURE OF THE INVENTION

The present invention was proposed in order to achieve the above-mentioned assignments, and its object is to provide an ultra-high molecular polyolefin multi-layer laminate exhibiting excellent abrasion resistance, tensile strength, shock resistance, heat-sealing property, uniformity in the film thickness, and that can be efficiently produced.

It is also an object of the present invention to provide a process and an apparatus for producing the above-mentioned multi-layer laminate maintaining good productivity.

According to the present invention, there is provided a multi-layer laminate comprising at least two layers:

(A) an oriented layer of an ultra-high molecular polyolefin having a limiting viscosity [η] of not smaller than 5 dl/g; and (B) a layer of a thermoplastic resin having a melting point which is lower than that of said ultra-high molecular polyolefin by not less than 5° C. as measured by a DSC method.

In the above-mentioned multi-layer laminate, it is desired that:

at least either one of the outermost layer and the innermost layer is the layer (B);

said multi-layer laminate has a coefficient of plane orientation "fa" of from 0.20 to 0.60 as measured by an X-ray diffraction method;

said multi-layer laminate has a coefficient of axial orientation "fc" of from 0.05 to 0.60 as measured by an X-ray diffraction method;

the ultra-high molecular polyolefin in said oriented layer (A) is an ultra-high molecular polyethylene;

the thermoplastic resin in said layer (B) is at least the one selected from a group consisting of an ethylene/α-olefin copolymer, a low-density polyethylene, an ethylene/vinyl acetate copolymer, an ethylene/(meth) acrylic acid copolymer, an ethylene/(meth)acrylic acid ester copolymer, an aromatic vinyl compound/ ethylene/butylene block copolymer, and an aromatic vinyl compound/ethylene/propylene block copolymer;

the thermoplastic resin in said layer (B) is at least partly modified with an unsaturated carboxylic acid or a derivative thereof;

provision is further made of a metal layer (C); and said multi-layer laminate has a tubular shape.

The present invention further provides a process for producing a multi-layer laminate having an oriented layer of an ultra-high molecular polyolefin comprising:

melt-extruding an ultra-high molecular polyolefin having a limiting viscosity [η] of not smaller than 5 dl/g into a screw die equipped with a second screw by using an extruder equipped with a first screw;

extruding a melt of the ultra-high molecular polyolefin extruded in the screw die into an annular outer die provided at an upper end of the screw due by using the second screw;

passing the melt of the ultra-high molecular polyolefin extruded into the outer die through an annular resin passage which upwardly extends being formed by an outer surface of a mandrel that is provided at an upper end of the second screw and revolves together with the second screw and by an inner surface of the outer die, and extruding a melt of a thermoplastic resin having a melting point lower than that of said ultra-high molecular polyolefin by not less than 5° C. as measured by a DSC method onto an upper portion in said annular resin passage so as to meet the flow of the melt of the ultra-high molecular polyolefin, thereby to form a tubular laminate; and upwardly taking up said tubular laminate extruded from the upper end of the outer die while inflating and vertically stretching it.

In the above-mentioned process for production, it is desired that:

a ratio (Ls/Ds) of the inner diameter (Ds) of an outlet of the screw die to the length (Ls) of said second screw is set to be not smaller than 1.5, and a ratio (Lm/Dm) of the inner diameter (Dm) of an inlet of the outer die to the length (Lm) of the mandrel is set to be from 4 to 70;

when the inner diameter at the top end (outlet) of the outer die is denoted by Dn, the melt of said thermoplastic resin and the melt of said ultra-high molecular polyolefin are caused to meet together at a position maintaining a distance of Dn/5 to 50Dn on the upstream side of the resin passage from the top end (outlet) of the outer die;

a melt of another thermoplastic resin is supplied into said annular resin passage and is caused to meet on the downstream side of a position where the melt of said thermoplastic resin and the melt of said ultra-high molecular polyolefin meet together; and said ultra-high molecular weight polyolefin is an ultra-high molecular weight polyethylene.

According to the present invention, there is further provided an apparatus for producing a laminate having an oriented layer of an ultra-high molecular polyolefin, comprising an extruder equipped with a first screw, a vertical screw die provided at an end of said extruder and is equipped with a second screw, and an annular outer die provided at an upper end of said vertical screw die, wherein a melt of an ultra-high molecular polyolefin having a limiting viscosity [η] of not smaller than 5 dl/g is extruded by the first screw into the screw die from the extruder, the melt of the ultra-high molecular polyolefin in said screw die is extruded by the second screw out of the outer die through the outer die, and the extruded tubular molded article in a molten state is inflated, vertically stretched and is taken up; wherein a mandrel penetrates through an annular space of said outer die, said mandrel being coupled to an upper end of said second screw and revolving together with said second screw;

a gas passage is extending from the lower end of said second screw passing through said mandrel;

an introduction port is formed in the side surface of an annular resin passage formed by the inner surface of the outer die and the outer surface of the mandrel for supplying a melt of a thermoplastic resin other than said ultra-high molecular polyolefin, the melt of said thermoplastic resin is supplied into the annular resin passage through said introduction port, so that a layer of said melt of said ultra-high molecular polyolefin and a layer of said melt of said thermoplastic resin meet together to form a tubular multi-layer laminate; and said tubular multi-layer laminate extruded from the upper end of the outer die is inflated by a gas blown from said gas passage at the upper end of said mandrel.

In the above-mentioned apparatus for production, it is desired that:

the introduction port for introducing the thermoplastic resin is a crosshead die portion formed in the outer die;

the introduction ports for introducing the thermoplastic resin are formed at plural places;

a ratio (Ls/Ds) of the inner diameter (Ds) of an outlet of the screw die to the length (Ls) of said second screw is set to be not smaller than 1.5, and a ratio (Lm/Dm) of the inner diameter (Dm) of an inlet of the outer die to the length (Lm) of the mandrel is set to be from 4 to 70;

when the inner diameter at the top end (outlet) of the outer die is denoted by Dn, the introduction port for introducing said thermoplastic resin is formed at a position maintaining a distance of Dn/5 to 50Dn on the upstream side of the resin passage from the top end (outlet) of the outer die; and said annular resin passage satisfies the conditions determined by the following formulas (i) an (ii):

S1/S2=0.5 to 3.0                    (i)

S2/S3=2.0 to 10.0                 (ii)

wherein S1 is a sectional area of the resin passage in the inlet of the outer die, S2 is a sectional area of the resin passage at an intermediate (half) point between the inlet of the outer die and said introduction port, and S3 is a sectional area of the resin passage at said introduction port.

In the multi-layer laminate including the ultra-high molecular polyolefin layer according to the present invention, both the layer of the ultra-high molecular polyolefin and the layer of the thermoplastic resin have been stretched and have, hence, been oriented. Accordingly, the multi-layer laminate of the present invention exhibits excellent abrasion resistance, tensile strength and shock resistance unlike the multi-layer laminates of the prior art which use the same resin but in which the layers have not been oriented.

Figure 1:
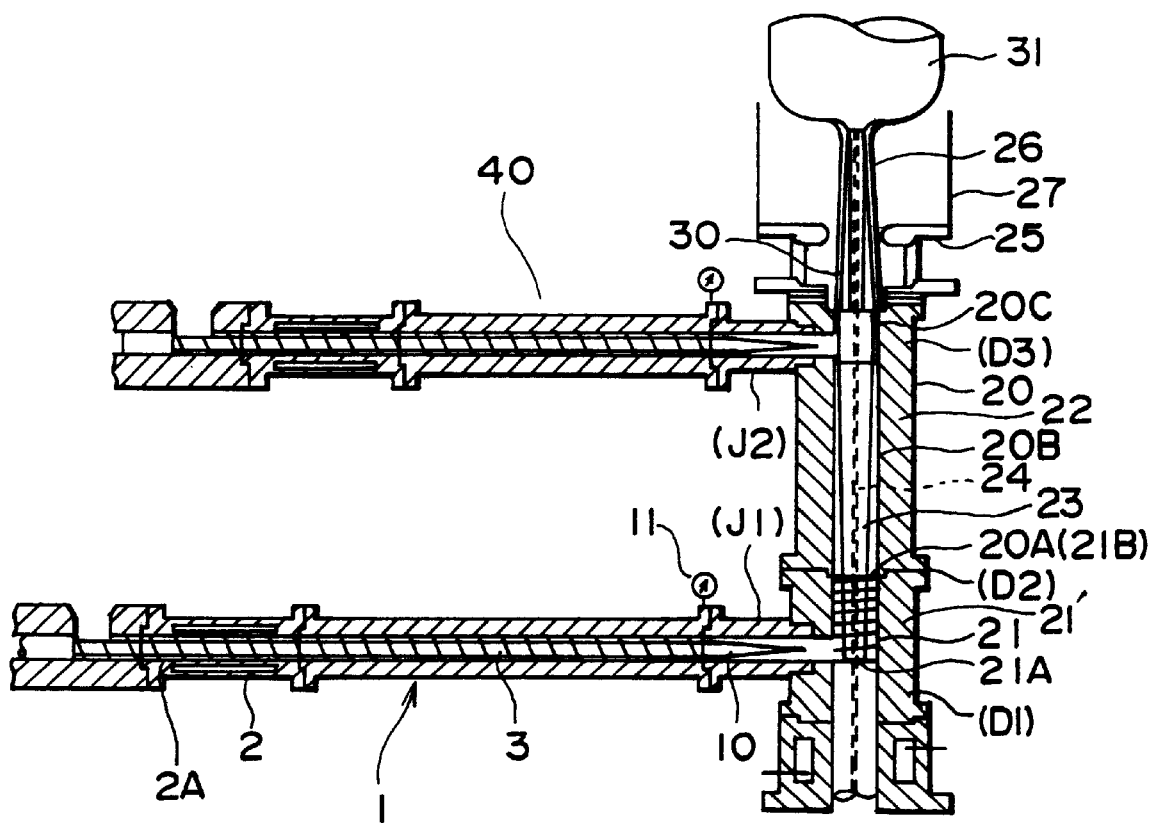
FIG. 1 is a sectional view of an apparatus for producing a multi-layer laminate of the present invention, wherein the film is produced relying upon an inflation method.

BEST MODE FOR CARRYING OUT THE INVENTION (A) Oriented Layer of an Ultra-High Molecular Polyolefin The ultra-high molecular polyolefin which is a starting resin is the one having a limiting viscosity [η] of not smaller than 5 dl/g, preferably, not smaller than 7 dl/g and, more preferably, from 8 to 25 dl/g as measured in a decalin solution at 135° C.

When the ultra-high molecular polyolefin having a limiting viscosity of smaller than 5 dl/g is used, the obtained laminate exhibits mechanical strengths such as tensile strength, shock resistance, etc. which are not sufficient. When the ultra-high molecular polyolefin has a limiting viscosity of smaller than 5 dl/g, furthermore, the melt viscosity becomes too low. Therefore, the melt of the ultra-high molecular polyolefin is twisted by the revolution of the mandrel in the screw die, and loses uniformity in the thickness due to the deflection of the mandrel, making it difficult to obtain a uniform film and, after all, causing the moldability to be deteriorated.

Though there is no particular upper limitation on the limiting viscosity [η], those having limiting viscosities in excess of 25 dl/g exhibit too high melt viscosity and tend to lose extrusion-moldability.

The ultra-high molecular weight polyolefin has an MFR (190° C., 2.16 kg) of smaller than 0.03 g/10 min., preferably, not larger than 0.02 g/10 min. and, more preferably, not larger than 0.01 g/10 min.

Among the ultra-high molecular weight polyolefins, an ultra-high molecular polyethylene is preferably used from the standpoint of strength and machinability.

The oriented layer of ultra-high molecular polyolefin in the multi-layer laminate of the present invention after molded has a limiting viscosity [η] L of not smaller than 5 dl/g, preferably, not smaller than 6 dl/g and, more preferably, from 7 to 25 dl/g.

When the limiting viscosity [η] L of the oriented layer of ultra-high molecular polyolefin is smaller than 5 dl/g, the mechanical properties such as tensile strength, shock resistance, etc. become poor, and the laminate exhibits deteriorated abrasion resistance.

Though there is no upper limit in the limiting viscosity [η] L, it is desired that the limiting viscosity [η] is not larger than 25 dl/g from the standpoint of appearance of the laminate.

The limiting viscosity [η] L of the oriented layer of ultra-high molecular polyolefin can be measured by, for example, scratching off the surface of a multi-layer laminate tube that will be described later and that has been cooled, picking up a sample of the ultra-high molecular polyolefin by cutting or the like method, and measuring the thus picked-up sample, or by scratching off the surface of the multi-layer laminate itself and picking up a sample of the ultra-high molecular polyolefin by cutting or the like method to measure the sample.

The ultra-high molecular polyethylene has a straight-chain molecular structure. Therefore, more increased strength and elasticity are obtained when the laminate obtained by using the ultra-high molecular polyethylene according to the present invention is stretched into an inflation film. The oriented layer of ultra-high molecular polyethylene has a limiting viscosity [η] L of desirably, not smaller than 7 dl/g and, more preferably, from 8 to 25 dl/g.

The degree of orientation of the multi-layer laminate is substantially equal to the degree of orientation of the oriented layer (A), and the degree of orientation of the other layer is usually negligibly small. It is therefore enough to know a suitable degree of orientation of the multi-layer laminate as a whole. That is, the multi-layer laminate preferably has a coefficient of plane orientation "fa" of from 0.20 to 0.60 as measured by the X-ray diffraction method or preferably has a coefficient of axial orientation "fc" of from 0.05 to 0.60 as measured by the X-ray diffraction method, from the standpoint of obtaining the aforementioned excellent properties.

(B) Thermoplastic Resin Layer

In the present invention, there is no particular limitation on the thermoplastic resin layer (B) that is laminated on the oriented layer of ultra-high molecular polyolefin, and any widely known thermoplastic resin layer can be used. Among them, the one having a melting point or a glass transition point whichever is higher lying over a range of from −100° C. to 350° C. as measured by the DSC is preferred from the standpoint of producing a laminate. It is further desired that the thermoplastic resin of the layer (B) has a melting point lower than that of the ultra-high molecular polyolefin of the oriented layer (A) by not less than 5° C.

Examples of the thermoplastic resin that can be used in the present invention include a polyolefin, polystyrene, a styrene-type copolymer containing a styrene unit, polyvinyl acetate, polyvinyl chloride, poly(meth)acrylic acid or poly (meth)acrylic acid ester, a metal salt of poly(meth)acrylic acid, polydiene (e.g., polybutadiene, polyisoprene, etc.) and a hydrogenated product thereof, a styrene/conjugated diene block copolymer and a hydrogenated product thereof, a polyester (e.g., polyethylene terephthalate, etc.), polyamide (e.g., nylon 6, nylon 66, etc.), and a polycarbonate.

According to the present invention, a polyolefin is particularly preferably used among these thermoplastic resins. The polyolefin referred to here is a homopolymer or a copolymer of α-olefin. As the copolymer, there can be exemplified the one containing not less than 55 mol % of an α-olefin component, such as ethylene/vinyl acetate copolymer, ethylene/vinyl alcohol copolymer, ethylene/(meth)acrylic acid copolymer, and ethylene/styrene copolymer.

As the α-olefin, there can be exemplified those of the form of a straight chain or a branch having 2 to 20 carbon atoms. Concrete examples include ethylene, propylene, 1-butene, 4-methyl-1-pentene, 1-hexene, 1-octene, 1-decene, 1-dodecene, 1-tetradecene, 1-hexadecene, 1-octadecene and 1-eicosene.

Among the polyolefins, it is desired to use an ethylene-type polymer. As the ethylene-type polymer, there can be used an ethylene homopolymer or an ethylene-type copolymer.

As the ethylene-type homopolymer used in the present invention, there can be exemplified a low-density polyethylene. The low-density polyethylene referred to here is obtained by, for example, a high-pressure radical polymerization method, and has a density of from 909 kg/m³ to 935 kg/m³.

As the ethylene-type copolymer, there can be exemplified those containing not smaller than 55 mol % of an ethylene component, such as ethylene/vinyl acetate copolymer, ethylene/vinyl alcohol copolymer, ethylene/(meth)acrylic acid copolymer, ethylene/styrene copolymer, and ethylene/α-olefin copolymer.

In the ethylene/α-olefin copolymer, for example, the α-olefin may be the above-mentioned one of the form of a straight chain or a branch having 3 to 20 carbon atoms.

The ethylene/α-olefin copolymer will be the one in which the molar ratio of ethylene/α-olefin is from 55/45 to 99.5/0.5, preferably from 60/40 to 99/1 and, more preferably, from 70/30 to 98/2.

It is also allowable to use small amounts of non-conjugated diene, triene or tetraene and, concretely, ethylidenenorbornene, vinylnorbornene, 1,4-hexadiene, 1,5-hexadiene, 7-methyl-1,6-octadiene, 1,7-octadiene, 1,9-decadiene, norbornadiene, and decatriene. Small amounts stand for not larger than 10 mol % with respect to the total polymer.

It is also allowable to use a copolymer of ethylene and a comonomer other than those described above. Examples include copolymers with two or more comonomers such as norbornene, cyclic olefin like tetracyclododecene, aromatic vinyl compound such as styrene, vinyl acetate, vinyl alcohol, (meth)acrylic acid, metal salts thereof, or esters thereof.

The ethylene homopolymer and/or copolymer has an MFR of from 0.05 to 400, preferably, from 0.1 to 200 and, more preferably, from 0.2 to 100 as measured at 190° C. under a load of 2.16 kg.

In particular, it is desired that the melting point of the thermoplastic resin layer (B) is lower than that of the ultra-high molecular weight polyolefin of the layer (A) by not less than 5° C. as measured by the DSC method. The melting point of the layer (A) is different from the melting point of the layer (B) by not less than 5° C. and, preferably, by not less than 7° C. and, more preferably, by not less than 10° C. Concretely, the melting point is not higher than 135° C., preferably, not higher than 130° C. and, more preferably, not higher than 125° C. There is no particular lower limit on the melting point. When the melting point is not lower than 50° C., the heat-sealed portions of the laminate exhibit excellent heat resistance and property for maintaining adhesion at high temperatures.

Here, the melting point measured according to the DSC method stands for a temperature at a maximum peak position on an endothermic curve of DSC. Concretely, the melting point stands for a value found from an endothermic curve at the time when a sample is charged into an aluminum pan, heated up to 200° C. at a rate of 10° C./min., maintained at 200° C. for 5 minutes, cooled down to room temperature at a rate of 20° C./min., and is heated at a rate of 10° C./min. To measure the melting point based on the DSC method, the multi-layer laminate may be directly measured, or the oriented layer (A) and the layer (B) may be scratched off from the multi-layer laminate or may be cut off and measured. Or the melting point of the starting resin may be employed. This is because, the melting point changes very little between the starting resin and the multi-layer laminate.

Multi-Layer Laminate

By taking the shock resistance, abrasion resistance, tensile strength and machinability into consideration, the multi-layer laminate of the present invention has a thickness of, usually, from 2 μm to 2000 μm, preferably, from 10 μm to 1000 μm and, more preferably, from 30 μm to 500 μm irrespective of its shape. In the multi-layer laminate of the present invention, the layer (A) has a total thickness of, usually, from 1 μm to 1800 μm, preferably, from 5 μm to 900 μm and, more preferably, from 15 μm to 490 μm, and the layer (B) has a total thickness of from 1 μm to 200 μm, preferably, from 3 μm to 100 μm and, more preferably, from 5 μm to 50 μm, though the invention is in no way limited thereto only.

A ratio ((A)/(B)) of the thickness of the layer (B) to the thickness of the layer (A) is, usually, from 1/1 to 1000/1, preferably, from 5/1 to 100/1 and, more preferably, from 10/1 to 50/1.

In the multi-layer laminate of the present invention, it is desired that the coefficient of plane orientation "fa" of the layer (A) as measured by the X-ray diffraction method is from 0.20 to 0.60, more preferably, from 0.25 to 0.55 and, particularly preferably, from 0.30 to 0.50. It is further particularly desired that the coefficient of axial orientation "fc" is from 0.05 to 0.60. Here, the whole laminate is measured by the X-ray diffraction method.

The thus oriented multi-layer laminate usually has the total thickness of from 2 $\mu$m to 200 $\mu$m, preferably, from 20 $\mu$m to 80 $\mu$m and, more preferably, from 30 $\mu$m to 60 $\mu$m, has the tensile strength in the machine direction (MD) direction of not smaller than 150 MPa, preferably, not smaller than 160 MPa but not larger than 300 MPa, and further has a shock resistance of usually not smaller than 70 KJ/m and, preferably, not smaller than 80 KJ/m. The above-mentioned oriented multi-layer laminate can be easily produced by expanding the diameter and by effecting the stretching in the vertical direction relying upon the inflation film method mentioned earlier.

When the degree of orientation lies within the above-mentioned range, the multi-layer laminate exhibits excellent shock resistance, abrasion resistance, tensile strength and machinability, and makes it possible to obtain a multi-layer laminate tube and a multi-layer laminate sheet that can be used even under severe conditions (very-low-temperature conditions, high tension conditions, vigorously abrading conditions). Process For Producing Multi-Layer Laminate The multi-layer laminate of the present invention is produced chiefly ① as a multi-layer laminate tube and ② as a multi-layer laminate sheet. The multi-layer laminate sheet ② is advantageously provided as a laminate having a layer constitution of ① and, particularly, as a laminate provided with a metal layer.

The multi-layer laminate of the present invention can be used ③ as a heat-sealed molded article upon heat-sealing or ④ as a metal layer-containing multi-layer laminate upon laminating a metal layer.

Described below in detail are the aspects of the individual multi-layer laminate molded articles. ①<Multi-Layer Laminate Tube>

A first aspect of the molded article of the ultra-high molecular polyethylene multi-layer laminate of the present invention is a multi-layer laminate tube. The multi-layer laminate tube of the present invention comprises at least two layers, i.e., (A) an oriented layer of an ultra-high molecular polyolefin having a limiting viscosity [η] of not smaller than 5 dl/g, and (B) a layer of a thermoplastic resin other than the ultra-high molecular polyolefin.

Examples of the multi-layer laminate tube will include a laminate tube having one layer (A) and one layer (B), and a laminate tube having one layer (A) and two layers (B). Concretely speaking, the examples include layer constitutions, such as (A)/(B), (B)/(A)/(B), etc.

In the laminate tube of the present invention, it is desired that either the outermost layer or the innermost layer is the layer (B), and more desirably either layer only is the layer (B).

In the laminate tube, there is no particular limitation on the length or on the outer diameter of the tube in cross section. From the standpoint of easy handling, however, it is desired that the tube has an outer diameter of not smaller than 10 cm but not larger than 100 cm in cross section.

As described above, the laminate tube of the present invention has no limitation on the size, and makes it possible to efficiently produce the molded articles or laminates on which other materials are laminated.

The multi-layer laminate tube of the present invention can be produced by a process which uses a particular die as described below.

That is, the multi-layer laminate tube is produced by a process which:
  uses a die that includes;
    a screw die arranged on the upstream side of the resin passage, has an introduction port for introducing an ultra-high molecular polyolefin at the most upstream portion of the resin passage, and has a screw therein, and an outer die which is disposed on the downstream side of the resin passage and has a mandrel that revolves together with said screw;
  introduces a melt of an ultra-high molecular polyolefin having a limiting viscosity [η] of not smaller than 5 dl/g into an end portion on the upstream side of said screw;
  transfers said melt toward the downstream side by using said screw; and
  orients the melt of the ultra-high molecular polyolefin in a fluidized manner in said outer die that follows said screw die.

In the above die, the screw die and the outer die may be constructed in the form of an integrated member. In this case, the junction point of the screw and the mandrel may be treated as the junction point of the screw die area and the outer die area.

However, from the view point of operation and maintenance, the above die is usually constructed by plural members. Accordingly, in many case, the above die is constructed by separated members of the screw die and the outer die.

In order to carry out the above-mentioned production process of the present invention, it is advantageous to use the die that includes a screw die arranged on the upstream side of the resin passage, has an introduction port for introducing an ultra-high molecular polyolefin at the most upstream portion of the resin passage, and has a screw therein, and an outer die which is disposed on the downstream side of the resin passage and has a mandrel that revolves together with said screw, a ratio (Ls/Ds) of the inner diameter (Ds) of an outlet of the screw die to the length (Ls) of the screw of said screw die being set to be not smaller than 1, especially not smaller than 1.5, and a ratio (Lm/Dm) of the inner diameter (Dm) of an inlet of the outer die to the length (Lm) of the mandrel of said outer die being set to be from 4 to 70.

The die of the present invention may include a crosshead die portion for introducing the molten thermoplastic resin to the downstream side of the screw die, and is capable of easily introducing the thermoplastic resin layer. Upon providing a plurality of crosshead die portions, it is allowed to provide a plurality of thermoplastic resin layers on the inside and/or the outside of the ultra-high molecular polyolefin.

An extruder for melting resins of the layers can be connected to the die.

As an apparatus for producing a multi-layer laminate of the present invention in which a plurality of extruders are connected to the die, there can be exemplified the one which comprises the above-mentioned die erected in the vertical direction, an extruder for melting the ultra-high molecular polyolefin, the extruder being connected to the port for introducing the ultra-high molecular polyolefin from said screw die in a horizontal direction, and an extruder for melting the thermoplastic resin, the extruder being connected to said crosshead die portion in the horizontal direction.

In the process for producing the multi-layer laminate, it is desired that the revolving speed of the screw (second screw)

of the screw die is set to be lower than the revolving speed of the screw (first screw) of the extruder for melting the ultra-high molecular polyolefin.

It is further desired that the molten thermoplastic resin meets the ultra-high molecular polyolefin in the outer die region on the downstream side of the screw die and, particularly, at a position of Dn/5 to 50Dn from the end of the outer die where Dn denotes the inner diameter of the outlet of the outer die. It is desired that they meet together owing to the provision of a crosshead die in the outer die region.

In inflating (expanding the diameter) and vertically stretching the laminate tube extruded from the outer die, furthermore, it is desired to blow a gas into the laminate tube.

In inflating (expanding the diameter) and vertically stretching the laminate tube that is extruded from the outer die, furthermore, a mandrel of a tapered shape may be used in the outer die.

Melting the Ultra-High Molecular Polyolefin

A known extruder for ultra-high molecular weight polyolefins can be used for melting the ultra-high molecular polyolefins. Desirably, the extruder has a grooved cylinder, and has a compression ratio of from 1 to 2.5 and, preferably, from 1.3 to 1.8 (a ratio L/D of the diameter D of the screw of the extruder to the length L of the screw being not smaller than 5, preferably, not smaller than 10 and, more preferably, from 20 to 70).

In order to melt the ultra-high molecular polyolefin, it is desired that the ultra-high molecular polyolefin is extruded at a temperature of, usually, not lower than a melting point thereof but not higher than 370° C. and, preferably, from 160° C. to 350° C. though it may differ depending upon the kind of the ultra-high molecular polyolefin. When the temperature for extrusion-molding is lower than the melting point, the resin tends to be clogged in the die, causing the apparatus to be damaged. Transferring the ultra-high molecular polyolefin in the screw die:

The molten ultra-high molecular polyolefin is introduced into the screw die from the ultra-high molecular polyolefin introduction port formed at the most upstream portion of the screw die, and is transferred to the downstream side of the passage by the screw in the screw die. It is desired that the screw in the screw die has a ratio (Ls/Ds) of the inner diameter (Ds) of the outlet of screw die to the length (Ls) of the screw of not smaller than 1 and, particularly, not smaller than 1.5 and, more particularly, not smaller than 2. In principle, the screw in the screw die revolves independently of the screw in the extruder for melting the ultra-high molecular polyolefin or the thermoplastic resin. The screw is provided mainly for stably maintaining a rate of transferring the molten ultra-high molecular polyolefin. Therefore, a ratio Ls/Ds of the screw die has a correlation to the productivity, and the rate of molding increases with an increase in the ratio Ls/Ds.

Referring to FIG. 1 illustrating an apparatus for producing a multi-layer laminate tube of the present invention, the screw die is usually so constituted that a ratio (Ls/Ds) of the inner diameter (Ds) of the screw die at the outlet 21B of the screw due to the length (Ls) from the root 21A of the screw to an end 21B thereof, is not smaller than 1 but is not larger than 30, preferably not smaller than 1.5 but not larger than 20, and more preferably, not smaller than 2 but not larger than 10. Here, it is desired that the screw die and the screw have an equal length.

In the production process of the present invention, it is desired to produce the laminate by setting the revolving speed of the screw of the screw die to be lower than the revolving speed of the screw in the extruder for melting the ultra-high molecular polyolefin. Upon so setting the revolving speeds, the melt of the ultra-high molecular polyolefin is compressed on the downstream side of the extruder, making it possible to obtain a homogeneous melt suppressing a decrease in the molecular weight caused by thermal decomposition. In molding the melt, the temperature at the inlet of the screw die is usually from 180° C. to 300° C. and, preferably, from 200° C. to 260° C. though it may vary depending upon the kind of the resin. Moreover, the temperature at the outlet of the screw die is, usually, from 180° C. to 260° C. and, preferably, from 190° C. to 230° C.

The molten ultra-high molecular polyolefin extruded from the screw die is transferred to the next outer die portion in which the mandrel is inserted.

Forming a Multi-Layer in the Outer Die

A multi-layer structure comprising an oriented layer of ultra-high molecular polyolefin and a thermoplastic resin layer is formed in the outer die.

In the outer die is provided a mandrel mounted on the end of the screw of the screw die. The mandrel revolves together with the screw of the screw die, and has a ratio (Lm/Dm) of the inner diameter (Dm) of the inlet of the outer die to the length (Lm) of the mandrel of from 4 to 70.

The melt of ultra-high molecular polyolefin transferred into the outer die by the screw die, is oriented in the direction of fluidization as it is further transferred through a narrow passage between the inner wall of the outer die and the mandrel.

The oriented layer of ultra-high molecular polyolefin is thus formed. In the outer die region in this case, the thermoplastic resin melted by using a separate extruder is caused to meet at least the inside or the outside of the ultra-high molecular polyolefin layer; i.e., the thermoplastic resin layer is laminated on the oriented layer of ultra-high molecular polyolefin. The thermoplastic resin layer, too, is oriented to some extent in the direction of fluidization.

Figure 2:
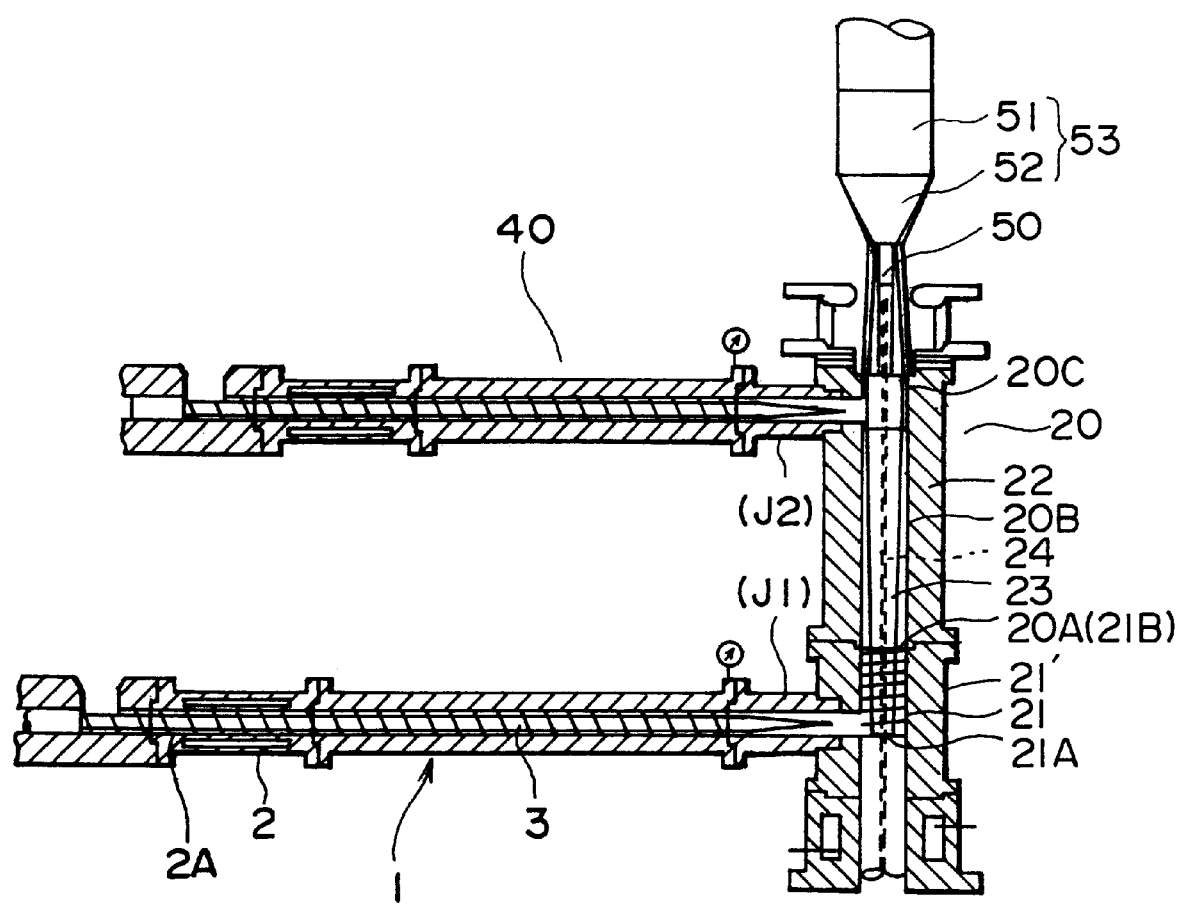
FIG. 2 is a sectional view of another apparatus for producing a multi-layer laminate of the present invention, wherein the multi-layer laminate is produced relying upon a tapered core method.

As shown in FIGS. 1 and 2, the thermoplastic resin meets through the thermoplastic resin introduction port formed in the outer die. An extruder for melting the thermoplastic resin is, usually, connected to the extruder, and the molten resin in the extruder flows into the outer die through the introduction port.

It is desired that the thermoplastic resin meets in the outer die region at a position of Dn/5 to 50Dn, preferably, Dn/5 to 30Dn and, more preferably, Dn/5 to 20Dn from the end of the outer die, where Dn denotes the diameter of the outlet at the end of the outer die. It is desired that the meeting point is separated by more than 3Dn from the inlet of the outer die. Upon meeting them at such a position, it is allowed to obtain a laminate having excellent uniformity in the thickness of the layer.

In the present invention, furthermore, it is particularly desired to meet the thermoplastic resin that is separately melted at the crosshead die portion. The crosshead die portion stands for a portion where the thermoplastic resin supplied from one direction is uniformly supplied in the circumferential direction. In the present invention, it is desired that the crosshead die portion is so provided that a point where the thermoplastic resin and the ultra-high molecular polyolefin meet together lies within the above-mentioned range. Here, the point where the thermoplastic resin and the ultra-high molecular polyolefin meet together stands for a point where the molten thermoplastic resin, first, comes into contact with the ultra-high molecular polyolefin layer, and stands for a position where the introduction port is formed. When the introduction ports are provided in a plural number, therefore, the introduction port on the most upstream side is used as a reference.

Figure 3:
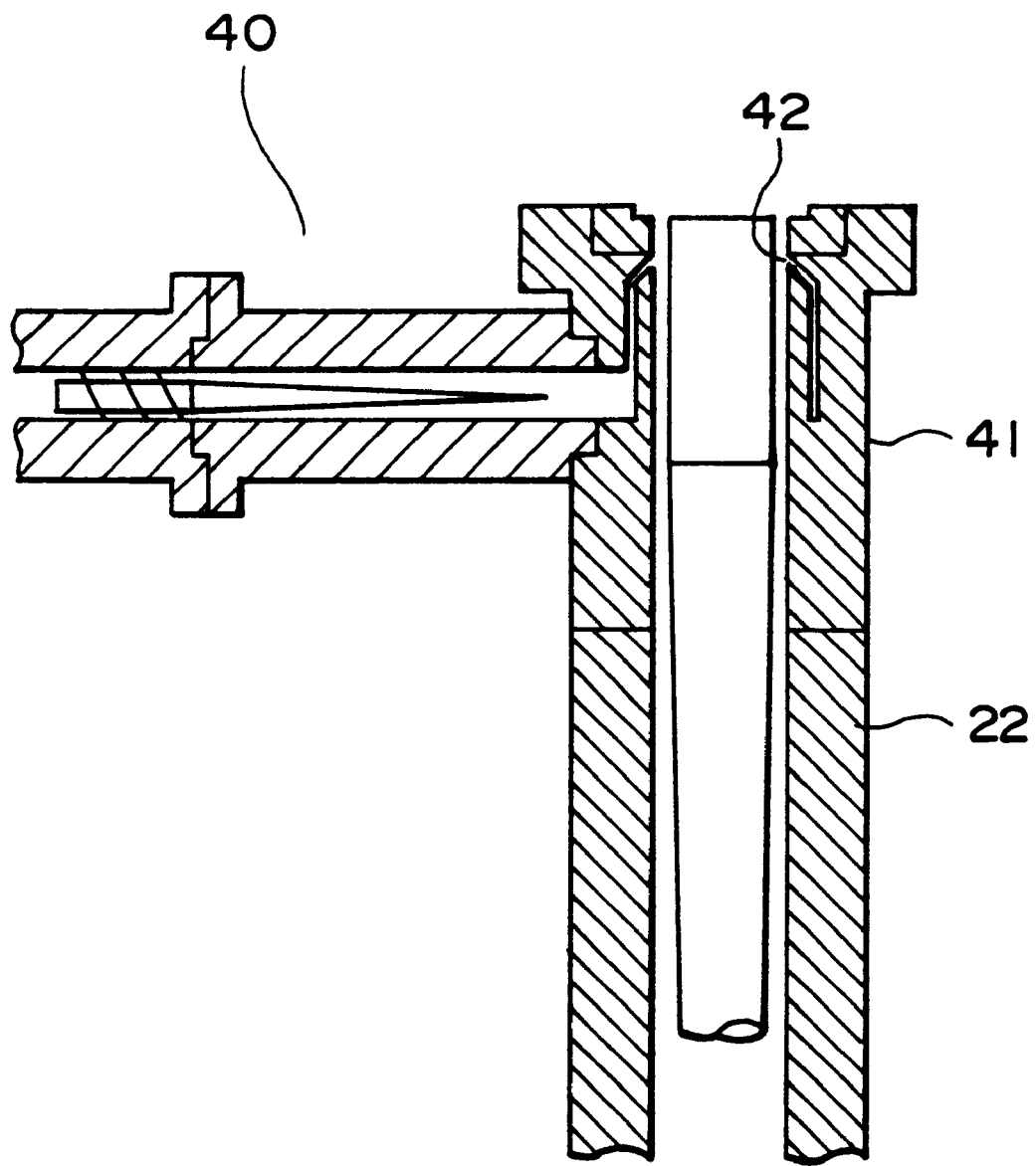
FIG. 3 is a sectional view of a crosshead die portion that can be used in the production apparatus of the present invention.

Basically, the crosshead die portion has a shape as shown in FIG. 3, and includes a molten resin inlet port, a transfer passage for flowing the resin that is introduced in parallel in the direction of fluidization of ultra-high molecular polyolefin, and an introduction port for causing the resin to meet the ultra-high molecular polyolefin. The crosshead die portion is provided, for example, as part of the outer die as shown in FIGS. 1 and 2, or is provided along the resin passage together with the screw die and the outer die separately from the outer die as shown in FIG. 3. In the present invention, it is desired that the crosshead die portion is provided on the downstream side of the outer die as shown in FIGS. 1 to 3, but may be provided in an intermediate portion of the outer die, or may be provided as a separate member between the screw die and the outer die, or may be provided as separate members among the outer dies by providing the outer dies in a plural number.

In FIGS. 1 and 2, it is important that a ratio (Lo/Dm) of the inner diameter (Dm) of the inlet 20A of the outer die to the length (Lo) from the inlet 20A of the outer die to the outlet 20C of the outer die, is not smaller than 4, preferably, is not smaller than 5 and, more preferably, is from 5 to 7. In the outer die in which Lo/Dm is smaller than 4, the ultra-high molecular polyolefin is not completely uniformly melted before it is extruded from the outer die. In expanding and vertically stretching the multi-layer laminate tube that is extruded from the die, therefore, the tube is neither uniformly expanded nor vertically stretched, or is often broken, making it difficult to obtain a molded article in a favorable form. It is desired that the ratio Lo/Dm is not larger than 70 from a practical point of view, though there is no particular upper limitation.

It is further desired that the length (Lo) of the outer die is equal to the length (Lm) of the mandrel.

The mandrel attached to the end of the screw of the screw die has an outer size that increases toward the end thereof in order to erase flight marks caused by the screw. That is, the compression ratio (Sn/Sm) or (sectional area (Sn) of the mandrel at the end portion 20C/sectional area (Sm) of the resin passage at a connection portion 20A to the second screw), is from 1.5 to 7, preferably, from 2 to 6 and, more preferably, from 3 to 5.

The same compression ratio may be imparted by decreasing the inner diameter of the outer die toward outlet thereof.

According to the present invention, after the step of meeting the thermoplastic resin and the ultra-high molecular polyolefin together, the laminate is extruded from the outer die to obtain a multi-layer laminate tube.

Melting the Thermoplastic Resin

The thermoplastic resin can be melted without any particular limitation by using an extruder such as a monoaxial extruder or a biaxial extruder. The temperature of the melting device will be not lower than a glass transition temperature or a melting point of the resin but is not higher than 370° C. and, preferably, not lower than 160° C. but is not higher than 350° C.

Inflating (Expanding the Diameter) and Vertically Stretching the Multi-Layer Laminate Tube A molded article of a multi-layer laminate of the thermoplastic resin and the ultra-high molecular polyolefin is obtained by inflating (expanding the diameter) and vertically stretching the multi-layer laminate tube extruded from the outer die. There is no particular limitation on the inflation (expanding the diameter) or the stretching. For example, a gas may be blown into the multi-layer laminate tube extruded from the outer die, or the coarsely molded tubular article may be inflated (expanded) and stretched by using a tapered core.

In effecting the inflation (expanding the diameter), it is desired that a ratio of the circumferential length of the tube after inflation (expansion of diameter) to the circumferential length of before the inflation (expansion of diameter) at the outlet of the outer die, is from 1.0 times to 20 times, preferably, from 1.1 times to 15 times and, more preferably, from 1.1 times to 12 times.

In the present invention, it is desired that a gas passage is provided in the screw of the screw die and in the mandrel and that a stabilizer rod is coupled to the end of the mandrel.

Next, described below are:

(1) A method (hereinafter often referred to as inflation method) of blowing a gas into the multi-layer laminate tube extruded from the outer die; and (2) A method (hereinafter often referred to as tapered core method) of inflating (expanding the diameter) and vertically stretching the multi-layer laminate tube by using a tapered core.

(1) Inflation Method

According to this method, the gas blown into the multi-layer laminate tube is, usually, the air. However, nitrogen or the like may be used. When the air is to be blown into the multi-layer laminate tube of the molten state, it is desired that a ratio (inflation ratio) of the circumferential length of the film before inflation (expansion of diameter) at the outlet of the outer die to the circumferential length of the film after inflation (expansion of diameter) is not smaller than 7 times, preferably, from 7 to 20 times and, particularly preferably, from 8 to 12 times. When the inflation ratio is within this range, i.e., not smaller than 7, the thickness seldom becomes nonuniform in the transverse direction (TD), and excellent mechanical properties such as tensile strength and shock resistance are exhibited. When the inflation ratio is not larger than 20 times, the film does not become cloudy and is rarely broken.

According to the present invention, it is desired that the vertical stretching ratio is not smaller than 7 times, preferably, from 7 to 40 times and, particularly, from 8 to 30 times. The vertical stretching ratio stands for a ratio of the flow-out speed (linear velocity) of the resin extruded from the die to the take-up speed of a pinch roll. When the vertical stretching ratio is not smaller than 7 times, the balloon (inflation tube) swings less, and the thickness becomes uniform in the machine direction (MD) and in the transverse direction (TD), and the mechanical properties are little dispersed. When the vertical stretching ratio is not larger than 40 times, furthermore, the film is rarely broken.

(2) Tapered Core Method

According to this method, a tapered core is connected to the end of the mandrel of the outer die to inflate (expand the diameter) and vertically stretch the multi-layer laminate tube. It is desired that a ratio (inflation ratio (expansion-of-diameter) ratio) of the circumferential length of the film of before inflation (expansion of diameter) at the outlet of the outer die to the circumferential length of the film after inflation (expansion of diameter) is from 1.0 to 5 times, preferably, from 1.0 to 4 times and, more preferably, from 1.1 to 3 times. When the inflation (expansion-of-diameter) ratio is not smaller than 1, it is easy to decrease the thickness and to increase the width. When the inflation (expansion of diameter) ratio is not larger than 5, there does not arouse such a problem that the multi-layer laminate tube that is becoming thinner is solidified and is no longer stretched or molded during the step of inflating (expanding the diameter) the multi-layer laminate tube by using the tapered core.

In the present invention, it is desired that the vertical stretching ratio is from 3 times to 60 times, preferably, from 5 times to 50 times and, more preferably, from 10 times to 40 times. The vertical stretching ratio stands for a ratio of the flow-out speed (linear velocity) of the resin extruded from the die to the take-up speed of a pinch roll. When the vertical stretching ratio is not smaller than 3 times, it is easy to reduce the thickness and to increase the width. When the vertical stretching ratio is not larger than 60 times, the molding condition becomes relatively wide, and the film is rarely broken in the step of vertical stretching.

Apparatus for Producing the Multi-Layer Laminate

The apparatus for producing the multi-layer laminate tube of the present invention will now be described with reference to the drawings.

Roughly speaking, the apparatus for production of FIG. 1 comprises a die 20 of the present invention which is so installed that the resin passage is vertically directed, and two extruders connected to the die from a horizontal direction, i.e., an extruder 1 for melting the ultra-high molecular polyolefin and an extruder 40 for melting the thermoplastic resin. The die of the invention includes a lower screw die 21' and an outer die 22 positioned thereon. To the screw die 21' is connected to an extruder for melting the ultra-high molecular polyolefin, and to the outer die 22 is connected an extruder 40 for melting the thermoplastic resin.

The extruder 1 for melting the ultra-high molecular weight polyolefin is equipped with a grooved cylinder 2 having formed therein a groove 2A and a screw 3 (hereinafter referred to as first screw) having a compression ratio of from 1 to 2.5 and, preferably, from 1.3 to 1.8. A torpedo is coupled in a threaded manner to an end of the first screw 3. It is desired that the torpedo 10 is formed in a conical shape in order to prevent the resin from staying at the end of the first screw 3.

Inside the screw die 21' is provided a screw 21 (hereinafter referred to as second screw), and the root 21A (upstream end of the resin flow passage) of the second screw is located at a position to face the torpedo 10. The second screw 21 is driven by a drive means (not shown) to revolve independently of the first screw 3.

To the upper end of the screw die 21' is connected the outer die 22 having the same inner diameter, and a mandrel 23 is inserted in the resin passage in the outer die 22. The mandrel 23 has an outer diameter that increases toward the end thereof, is secured to an end of the second screw 21, and revolves together with the second screw.

In the above-mentioned production apparatus, the powder of ultra-high molecular polyolefin is stably supplied toward the front of the extruder due to the groove of the grooved cylinder 2.

The screw die has a ratio (Ls/Ds) of the inner diameter (Ds) of the screw die at the outlet 21B of the screw die to the length (Ls) of from the root 21A to the end 21B of the screw, of from 1 to 30, preferably, from 1.5 to 20 and, more preferably, from 2 to 10.

A ratio (S1/S2) of the sectional area S2 of the resin passage at an intermediate portion 20B of the outer die (intermediate point between the inlet of the outer die and a point where the thermoplastic resin meets) to the sectional area S1 of the resin passage at the end of the second screw (inlet of the outer die) 20A, is from 0.5 to 3.0 and, preferably, from 0.8 to 2.5. Furthermore, a ratio (S2/S3) of the sectional area S3 of the resin passage at a point where the thermoplastic resin meets to the above-mentioned sectional area S2, is from 2.0 to 10.0 and, preferably, from 2.0 to 6.0.

There is no problem provided the ratio S1/S2 lies within a range of from 0.5 to 3.0. When the ratio S2/S3 is smaller than 2.0, however, the molten resin is not completely homogenized. When the ratio S2/S3 is not smaller than 10, on the other hand, the resin pressure becomes so great that it becomes difficult to extrude the multi-layer laminate tube.

When the thermoplastic resin introduction ports exist in a plural number, the sectional areas S2 and S3 are found with the introduction port on the most downstream side as a reference.

As described above, basically, the sectional area of the resin passage between the outer die and the mandrel inserted therein decreases toward the outlet 20° C. of the outer die. That is, though the tapered mandrel is used, the sectional area of the resin passage does not change after at least the position (outlet side of the outer die) where the thermoplastic resin meets. The so-called straight shape is desired from the standpoint of molding the articles maintaining a high dimensional precision.

The apparatus for producing the multi-layer laminate tube has means for supplying the molten thermoplastic resin to meet the inner side or the outer side of the ultra-high molecular weight polyolefin layer in the outer die region. It is desired that the meeting means is so disposed that, when the inner diameter of the outlet of the outer die is denoted by Dn, the distance from the end of the outer die is not smaller than Dn/5 but is not larger than 50Dn, preferably, not smaller than Dn/5 but not larger than 30Dn and, more preferably, not smaller than Dn/5 but not larger than 20 Dn. It is desired that the distance of the meeting position from the inlet 20A of the outer die 22 is not smaller than 4Dm (where Dm is the inner diameter of the inlet of the outer die). By effecting the meeting at such a position, there is obtained a laminate having excellent uniformity in the thickness of the layer.

In the present invention, furthermore, it is particularly desired to meet the thermoplastic resin that is separately melted by using the crosshead die portion. The crosshead die portion stands for a portion where the thermoplastic resin supplied from one direction is uniformly supplied in the circumferential direction.

According to the present invention as shown in FIG. 3, it is desired to use a crosshead die portion 41 which is a separate member from the outer die. Here, a position 42 where the thermoplastic resin and the ultra-high molecular polyolefin meet together is a position where the molten thermoplastic resin first comes in contact with the ultra-high molecular polyolefin layer.

According to the present invention, after the step of meeting the thermoplastic resin and the ultra-high molecular polyolefin together, the multi-layer laminate tube is extruded from the outer die.

Referring to FIG. 1 illustrating a preferred embodiment of the apparatus for producing the multi-layer laminate tube of the present invention, the above-mentioned constitution is provided and, on the downstream side of the outer die 22, a gas passage 24 is formed in the second screw 21 and in the mandrel 23 as means for effecting the first inflation (expansion of diameter) and vertical stretching. The gas passage 24 is formed from the lower end of the second screw 21 up to the end of the stabilizer rod 26 through the metal shaft. The multi-layer laminate tube 30 extruded from the outer die 22 is cooled by blowing the air through the air ring 25, and is inflated at the above-mentioned inflation ratio with the gas such as the air through the gas passage 24, to form an inflation film 31 having a thickness of, for example, 10 to 100 μm which is then folded. Here, provision is made of a stabilizer plate for taking up the film after it is folded, a pinch roll, a take-up device (none of them are shown), etc., which have been furnished in the known inflation film-forming machines.

As required, furthermore, the stabilizer rod 26 is provided in the upper inner portion of the outer die 22 being inserted through the air ring 25 and a windbreak cylinder 27, the stabilizer rod 26 being constituted by a pipe loosely fitted to a metal shaft which is threaded into the end of the mandrel. The metal shaft revolves in synchronism with the revolution of the second screw 21, and the pipe is loosely fitted to the shaft. Therefore, the multi-layer laminate tube 30 is linearly extruded while being brought into contact with the outer surface of the pipe, but is not twisted by the pipe.

The molten resin extruded from the extruder 1 of the apparatus for producing the multi-layer laminate tube, is received by the second screw 21 of the screw die 21'. Furthermore, the number of revolutions of the second screw 21 is so set that a pressure indicated by a pressure gauge 11 of the extruder 1 shown in FIG. 1 lies within a predetermined range. The multi-layer laminate tube 30 of the molten state extruded from the outer die 22 is taken up at a speed faster than the extrusion speed. Then, the multi-layer laminate tube 30 is inflated at a predetermined inflation ratio with the gas emitted from the end of the stabilizer rod through the gas passage, and a multi-layer laminate is obtained. Here, the machine direction (MD) stands for a direction in which the film is taken up, and the transverse direction (TD) stands for a direction at right angles thereto.

In another preferred embodiment of the apparatus for producing the multi-layer laminate tube as shown in FIG. 2, the above-mentioned constitution is provided, and a tapered core 53 is coupled to the end of the mandrel as means for effecting the first expansion of diameter and vertical stretching on the downstream side of the outer die 22.

The tapered core 53 is mounted on the end of the outer die 22 being loosely fitted to the metal shaft 50, and the metal shaft 50 is coupled in a threaded manner to the end of the mandrel. The metal shaft 50 revolves in synchronism with the revolution of the second screw 21. However, since the tapered core 53 is loosely fitted to the metal shaft 50, the multi-layer laminate tube 30 is linearly extruded in contact with the outer surface of the tapered core 53 but is not twisted by the metal shaft 50.

The outer diameter of the metal shaft 50 is usually smaller than the outer diameter of the mandrel, and has a length of, usually, from about 50 to about 150 cm. The tapered core 53 makes it possible to effectively expand the diameter of the multi-layer laminate tube that is extruded from the outlet 20C of the outer die. In expanding the diameter, furthermore, the frictional resistance is decreased facilitating the molding. The tapered core 53 is constituted by a tapered portion 52 which is tilted at an angle of usually, 5 to 50 degrees and, preferably, 10 to 30 degrees with respect to the axial direction of the shaft 50, and a cylindrical portion 51 continuous to the tapered portion 52.

②<Multi-Layer Laminate Sheet>

The second aspect of the ultra-high molecular polyethylene multi-layer laminate of the present invention is a sheet-like multi-layer laminate.

Examples of the multi-layer laminate sheet will include a laminate including a layer (A) of the ultra-high molecular polyolefin and a layer (B) of a thermoplastic resin, and a laminate including a layer (A) and two layers (B). The multi-layer laminate sheet can be produced by, for example, cutting the above-mentioned multi-layer laminate tube ①.

There can be further exemplified a multi-layer laminate sheet having two or more layers (A). Examples include multi-layer laminate sheets having arrangements (A)/(B)/((A)/(B))n (where n is an integer, i.e., n≧1) such as (A)/(B)/(A)/(B), and multi-layer laminate sheets having arrangements (B)/((A)/(B))m (where m is an integer, i.e., m≧1) such as (B)/(A)/(B)/(A)/(B).

Such multi-layer laminate sheets can be obtained by simultaneously using two or more apparatuses for producing the multi-layer laminate described in the process for producing the laminate tube, and laminating the multi-layer laminate sheets obtained by cutting the multi-layer laminate tubes obtained by these apparatuses. It is, of course, allowable to produce them by preparing a plurality of multi-layer laminate sheets by cutting the multi-layer laminate tube obtained by using a single apparatus for producing the multi-layer laminate, and by superposing plural pieces of these sheets followed by thermal adhesion.

It is desired that the layer (A) and the layer (B) are directly adhered together. As for the layer (B), several kinds of the layers may be formed continuously. In the laminate (A)/(B), for example, the layer (B) may comprise two layers (B)-1 and (B)-2, i.e., having a structure (A)/(B)-1/(B)-2. In this laminate, the layers (B)-1 and (B)-2 will be a suitable combination of the layers of the above-mentioned ethylene homopolymer and/or copolymer. In such a multi-layer laminate sheet, it is desired that at least either the outermost layer or the innermost layer is the layer (B).

③<Heat-sealed molded article>

The heat-sealed molded article according to the present invention is the one obtained by heat-sealing the above-mentioned multi-layer laminate. The multi-layer laminates may be heat-sealed together, or the multi-layer laminate may be heat-sealed together with other material. When the multi-layer laminates are to be heat-sealed together, it is desired to heat-seal the layers (B) together from the standpoint of heat-sealing at a low temperature maintaining adhesion strength. When the multi-layer laminate is to be heat-sealed together with other material, there is no particular limitation on the other material and it is desired that the other material is a polyolefin. It is particularly desired that the other material is an ethylene-type (co)-polymer containing at least not less than 55 mol % of an ethylene component.

According to the present invention, the heat-sealed molded article is usually heat-sealed under the conditions of:

Sealing bar temperature: not lower than a melting point of the layer (B) but not higher than 133° C., Sealing pressure: 0.2 MPa to 10 MPa, Sealing time: 0.2 seconds to 30 seconds.

The thus obtained heat-sealed molded article, e.g., the molded article obtained by heat-sealing the above-mentioned multi-layer laminates together, exhibits a high adhesion strength and excellent properties such as shock resistance, abrasion resistance and tensile strength that stem from excellent properties of the multi-layer laminate. Therefore, there is obtained a tough bag which can be used as a variety kinds of packaging materials.

④<Metal Layer-Including Multi-Layer Laminate>

The multi-layer laminate of the present invention may further include a metal layer.

A first aspect of the metal layer-including multi-layer laminate will be the one comprising at least the three layers: i.e., (A) an oriented layer of an ultra-high molecular polyolefin having a limiting viscosity [η] of not smaller than 5;

(B) an ethylene-type polymer layer having a melting point which is lower than the melting point of the layer (A) by not less than 5° C. as measured by the DSC method and is modified with an unsaturated carboxylic acid; and (C) a metal layer;

wherein the layer (B) and the layer (C) are in contact with each other, and the coefficient of plane orientation "fa" of the laminate comprising the layer (A) and the layer (B) excluding the metal layer (C) is from 0.20 to 0.60 as measured by the X-ray diffraction method.

A second aspect of the metal layer-including multi-layer laminate of the present invention will be the one comprising, for example, at least the three layers: i.e., (A) an oriented layer of an ultra-high molecular polyolefin having a limiting viscosity [η] of not smaller than 5;

(B) an ethylene-type polymer layer having a melting point which is lower than the melting point of the layer (A) by not less than 5° C. as measured by the DSC method; and (C) a metal layer;

wherein the layer (B) and the layer (C) are in contact with each other, and the coefficient of axial orientation "fc" of the laminate comprising the layer (A) and the layer (B) excluding the layer (C) is from 0.05 to 0.60 as measured by the X-ray diffraction method.

The polymer which serves as a starting material of the ethylene-type homopolymer and/or copolymer modified with an unsaturated carboxylic acid constituting the layer (B), may be the one same as the polymer used for the above-mentioned thermoplastic resin layer (B).

It is desired that the polyolefin resin modified with an unsaturated carboxylic acid has a grafted amount of unsaturated carboxylic acid or a derivative thereof of from 0.01 to 10% by weight and, preferably, from 0.1 to 5% by weight, and has a melt flow rate (MFR: ASTMD1238, F) of from 0.1 to 50 g/10 min. and, preferably, from 0.2 to 20 g/10 min.

The grafted amount (% by weight) referred to here stands for the number of grams of the unsaturated carboxylic acid that is grafted per 100 g of the starting resin.

When the grafted amount of the unsaturated carboxylic acid or a derivative thereof is smaller than 0.01% by weight, the adhesion may not often be sufficient between the ultra-high molecular weight polyolefin (A) and the metal layer (C). When the grafted amount exceeds 10% by weight, on the other hand, the cross-linking partly takes place, the moldability is deteriorated, and the adhesion strength decreases.

So far as the MFR lies within the above-mentioned range, moldability and adhesiveness are both favorably exhibited. When the MFR lies outside the above-mentioned range, the melt viscosity becomes either too high or too low, often exhibiting poor moldability and adhesive strength.

Examples of the unsaturated carboxylic acid or a derivative thereof to be grafted to the ethylene homopolymer and/or ethylene-type copolymer which are the starting materials, include unsaturated carboxylic acid such as acrylic acid, maleic acid, fumaric acid, tetrahydrophthalic acid, itaconic acid, citraconic acid, crotonic acid, isocrotonic acid and Nadic acid™ (endo-cis-bicyclo[2.2.1]hept-5-ene-2,3-dicarboxylic acid), and derivatives thereof (such as acid halide, amide, imide, anhydride, ester, etc.).

Concrete examples of the derivative of the unsaturated carboxylic acid include malenyl chloride, maleimide, anhydrous maleic acid, anhydrous citraconic acid, monomethyl maleate, dimethyl maleate and glycidyl maleate.

Among them, it is desired to use an unsaturated dicarboxylic acid or an acid anhydride thereof and, particularly, maleic acid, Nadic acid™ or an acid anhydride thereof.

A variety of widely known methods can be suitably utilized for producing a modified product by graft-copolymerizing an ethylene/α-olefin random copolymer of before being modified with a graft monomer selected from the unsaturated carboxylic acid or a derivative thereof. For example, a method in which an ethylene/α-olefin random copolymer is melted and is graft-copolymerized by the addition of a graft monomer, or a method in which the ethylene/α-olefin random copolymer is dissolved in a solvent and is graft-copolymerized by the addition of a graft monomer.

In either case, it is desired to carry out the reaction in the presence of a radical reaction initiator (radical initiator) in order to efficiently graft-copolymerize the graft monomer. The grafting reaction is carried out usually at a temperature of from 60 to 350° C. The radical initiator is used, usually, in an amount of from 0.001 to 1 part by weight per 100 parts by weight of the ethylene/α-olefin random copolymer.

As the radical initiator, there can be exemplified an organic peroxide, an organic perester and an azo compound.

Among these radical initiators, it is desired to use dialkyl oxides, such as dicumyl peroxide, di-tert-butyl peroxide; 2,5-dimethyl-2,5-di(tert-butylperoxy)hexyne-3;2,5-dimethyl-2,5-di(tert-butylperoxy) hexane; and 1,4-bis(tert-butylperoxyisopropyl) benzene.

The unsaturated carboxylic acid-modified polyolefin resin used in the present invention as an adhesive may be partly diluted with the unmodified polyolefin such as an ethylene/α-olefin random copolymer. In this specification, such a case is expressed as "partly modified". When partly modified, the grafted amount of the modifying agent such as unsaturated carboxylic acid must be such that an average grafted amount as a mixture lies within the above-mentioned range.

In the present invention, a feature resides in that a melting point of the modified ethylene homopolymer and/or copolymer as measured by the DSC method is lower than a melting point of the ultra-high molecular polyolefin layer (A) by more than 5° C.

The metal layer (C) used in the present invention is the one comprising a metal such as aluminum, steel, tin, zinc, copper, silver, gold or nickel, or a metal containing one, two or more of them as chief components.

There is no particular limitation on the thickness of the metal layer, and there can be employed a metal-vaporized film, a metal plate or a metal foil.

Among them, steel and aluminum are particularly desired as metals.

The adhesion surfaces of the metal plate may be subjected to the surface treatment, such as dewaxing, sand-blast treatment, or primer treatment such as epoxy resin coating.

In producing a multi-layer laminate comprising (A) the ultra-high molecular polyolefin/(B) the ethylene homopolymer and/or the ethylene-type copolymer/(C) a metal layer according to the present invention, it is desired to heat-press-adhere:

an ultra-high molecular weight polyolefin multi-layer laminate comprising at least two layers, i.e., (A) an oriented layer of ultra-high molecular weight polyolefin having a limiting viscosity [η] of not smaller than 5, and (B) an unsaturated carboxylic acid-modified ethylene-type homopolymer and/or a copolymer thereof having a melting point lower than that of said layer (A) by not less than 5° C. as measured by the DSC method; or an ultra-high molecular polyolefin multi-layer laminated layer having a coefficient of axial orientation "fc" of from 0.05 to 0.60 as measured by the X-ray diffraction method;

on a metal material that serves as a metal layer.

The measurement based on the X-ray diffraction is effected for the multi-layer laminate without the metal layer, i.e., for the multi-layer laminate comprising (A) and (B) before it is adhered to the metal.

The conditions for the heat-press-adhesion are:

adhering temperature: not lower than a melting point of the layer (B) but not higher than 133° C., adhering pressure: not lower than 0.2 MPa but not higher than 100 MPa, adhering time: not shorter than 1 second but not longer than 30 minutes.

Upon employing the above-mentioned production process, the heat-press-adhesion to the metal material is accomplished at a low temperature, and the obtained multi-layer laminate is not accompanied by such problems as warping, etc.

The multi-layer laminate comprising (A) an ultra-high molecular polyolefin/(B) an ethylene homopolymer and/or an ethylene-type copolymer/(C) a metal layer obtained according to the present invention, can be preferably used as lining materials (chute, hopper, conveyer line) in a variety of industrial applications such as agriculture, civil engineering, manufacturing industries, coal industries, steel industries, etc.

INDUSTRIAL APPLICABILITY

The multi-layer laminates of the present invention exhibit excellent abrasion resistance, tensile strength, shock resistance and heat-sealing property, and can be efficiently produced. Among the multi-layer laminates of the present invention, the heat-sealed molded article exhibits excellent abrasion resistance, tensile strength, shock resistance, and heat-sealing strength. Among the multi-layer laminates of the present invention, the one having an ultra-high molecular polyolefin layer and a metal layer, exhibits excellent adhesiveness between the metal layer and the ultra-high molecular polyolefin layer, enabling the metal layer and the ultra-high molecular polyolefin layer to be adhered together at a low temperature without developing warping or the like phenomena.

The present invention further provides a process and an apparatus for producing a multi-layer laminate including an oriented ultra-high molecular polyolefin layer which makes it possible to adjust mechanical properties such as tensile strength, shock resistance, as well as vertical stretching ratio and film thickness over wide ranges.

In particular, an inflation film produced by using the process and apparatus of the present invention while setting the inflation ratio and the vertical stretching ratio to be not smaller than 7, suppresses a drop in the molecular weight when it is molded, and maintains the properties of the ultra-high molecular polyolefin to a sufficient degree, without substantially causing the thickness to become irregular.

Accordingly, the multi-layer laminate obtained according to the present invention can be used as a lining material such as of silo, hopper and chute; separator for non-aqueous electrolytic cells and electrolytic cells such as alkali cell, lithium ion cell, lead storage battery, nickel-hydrogen cell, nickel-cadmium cell, etc.; contraction film for coating such as roll, pipe, steel pipe, etc.; packaging film for packing foods; packaging bag; packaging container; and articles for sports such as helmet, sail board, gliding surfaces of skis, etc.

Other concrete examples include sliding tape; thrust washer; slide sheet; guide; doctor knife; cassette tape liner; slit sheet for cassette tapes; bag that withstands very low temperatures; heat-shrinking film; bag for preservation at low temperatures; packaging tape; yarn for producing highly strong stretched yarns; capacitor film; insulating film; polyolefin-coated rubber roll; bag for packing foods; blood pack; split yarn; rope for mountain climbing; woven fabric; stretched tape; filter for preventing platelet from freezing; sail cloth; sheet for preventing detonation; protection clothing for preventing wounds; safety gloves; heavy cloth; electric cables; tension member; vibration board for speakers; armor plate; radar dome; nonwoven fabric; capacitor film; synthetic paper; printing paper for outdoor exhibition; envelope for air mail; packaging materials such as water-absorbing agent and oxygen-absorbing agent; packaging materials such as air-permeable packaging material, controlling/sterilizing packaging material, base cloth for medical treatment, medical utensils; sealing package for water content-adjusted articles; separation film; filtering materials such as a variety of filters; filter carrier; agricultural films such as agricultural house and multi-film; and construction materials such as green film, electret film, house wrap, etc.

EXAMPLES

The invention will now be described by way of Examples which are to explain suitable embodiments of the invention and, hence, the invention is in no way limited thereto only unless it does not depart from the gist thereof.

Example 1

An ultra-high molecular polyethylene/a low-density polyethylene multi-layer laminate film was prepared based on an inflation method shown in FIG. 1 by using an apparatus having the below-mentioned specifications.

Extruder (extruder 1, first screw) for melting the ultra-high molecular polyethylene:

Outer diameter of first screw: 50 mm

Effective length of first screw: 1100 mm (L/D=22)

Flight pitch of first screw: 30 mm constant

Compression ratio of first screw: 1.8

Die erected on the extruder:

Outer diameter of screw (second screw)in the screw die: 50 mm

Effective length of second screw: 160 mm (L/D=3.2)

Total length of the length of second screw and the length of mandrel in the outer die: 1075 mm (L/D =1075/50= 21.5)

Flight pitch of second screw: 30 G mm constant

Compression ratio of second screw: 1.0

Inner diameter of outer die at the outlet of outer die: 50 mm

Outer diameter of mandrel at the outlet of outer die: 46 mm

Ratio of the sectional area S2 of the resin passage at an intermediate portion of outer die (intermediate point between the inlet of outer die and a position where the thermoplastic resin meets) to the sectional area S1 of the resin passage at an end of the second screw (inlet of outer die): S1/S2=1.20

Ratio of the sectional area S3 of the resin passage at a position where the thermoplastic resin meets to the sectional area S2: S2/S3=3.06

Extruder (extruder 2, third screw) for melting the thermoplastic resin:

Outer diameter of third screw: 30 mm

Effective length of third screw: 660 mm (L/D=22)

Flight pitch of third screw: 30 mm constant

Compression ratio of third screw: 3.0

The thermoplastic resin meets at a position 50 mm away from the outlet of outer die (1Dn: where Dn is an inner diameter of outer die at the outlet of outer die)

Stabilizer rod:
  Outer diameter: 41 mm
  Length: 400 mm

The apparatus further comprises a gas passage of 8 mm in diameter extending through the second screw and mandrel, and stabilizer rod, a stabilizer plate, a pinch roll, and a product take-up device.

(Production of the Multi-Layer Laminate Film By the Inflation Method)

A powdery resin of an ultra-high molecular polyethylene ([η]: 14.0 dl/g, MFR: smaller than 0.01 g/10 min, m.p.: 136° C., bulk density: 470 kg/m$^3$) was used as the ultra-high molecular polyolefin. A joint portion (J1) of the extruder 1 for the ultra-high molecular polyethylene shown in FIG. 1, a base portion (D1) of screw die, an inlet (D2) of outer die, and an end (D3) of outer die were set at temperatures of 280° C., 230° C., 200° C. and 170° C., respectively. The revolving speed of the first screw in the extruder 1 was set to be 15 min$^{-1}$, and the revolving speed of the second screw in the screw die was set to be 5 mi0.$^{-1}$.

As the thermoplastic resin, furthermore, there was used a pelletized resin of a low-density polyethylene (MFR: 2.1 g/10 min, m.p.: 120° C., density: 920 kg/m$^3$). A joint portion (J2) between the extruder 2 and the outer die was set at a temperature of 220° C., and the revolving speed of the third screw in the extruder 2 was set to be 10 min$^{-1}$. The take-up speed of the pinch roll was set at 4.1 m/min. While taking up the multi-layer laminate that is obtained, the compressed air was blown into the multi-layer laminate from the gas passage of 8 mm in diameter that is extending through the second screw, through the mandrel and through the stabilizer rod, in order to inflate the multi-layer laminate into about 8 times of the inner diameter (50 mm) of the outer die. Thus, there was stably obtained a multi-layer laminate film of the ultra-high molecular polyethylene/low-density polyethylene having a folding width of 620 mm and a thickness of 30 μm based on the inflation method.

Example 2

Inflation Method

An ultra-high molecular polyethylene/a low-density polyethylene multi-layer laminate film was formed based on the inflation method under the conditions of Example 1 with the exception of:

Revolving speed of first screw: 7.5 rpm

Revolving speed of second screw: 2.5 rpm

Revolving speed of third screw: 5 rpm

Take-up speed of multi-layer laminate: 1.3 m/min.

Inflation ratio of multi-layer laminate: 8.0 times

Folding width: 620 mm

Thickness: 50 μm.

Example 3

Tapered Core Method

A thin ultra-high molecular polyethylene/a low-density polyethylene multi-layer laminate tube was prepared based on the tapered core method by using an apparatus shown in FIG. 2 having the following specifications:

Apparatus:

Extruder (extruder 1, first screw) for melting the: ultra-high molecular polyethylene Outer diameter of first screw: 30 mm Effective length of first screw: 660 mm (L/D=22)

Flight pitch of first screw: 18 mm constant

Compression ratio of first screw: 1.7

Die at right angles with the extruder:

Outer diameter of screw (second screw) in the screw die: 100 mm

Effective length of second screw: 260 mm (L/D=2.6)
  Total length of the length of second screw and the length of mandrel in outer die: 880 mm (L/D=880/100=8.8)

Flight pitch of second screw: 50 mm constant

Compression ratio of second screw: 1.0

Inner diameter of the outlet of outer die: 100 mm

Outer diameter of mandrel at the outlet of outer die: 94 mm

Ratio of the sectional area S2 of the resin passage at an intermediate portion of outer die (intermediate point between the inlet of outer die and a position where the thermoplastic resin meets) to the sectional area S1 of the resin passage at an end of the second screw (inlet of outer die): S1/S2=2.40

Ratio of the sectional area S3 of the resin passage at a position where the thermoplastic resin meets to the sectional area S2: S2/S3=2.00

Extruder (extruder 2, third screw) for melting the thermoplastic resin:

Outer diameter of third screw: 20 mm

Effective length of third screw: 44.0 mm (L/D=22)

Flight pitch of third screw: 20 mm constant

Compression ratio of third screw: 3.0

The thermoplastic resin meets at a position 30 mm away from the outlet of outer die (1.5Dn/5)

Tapered core:

Outer diameter: 110 mm

Length: 230 mm

The apparatus further comprises a gas passage of 6 mm in diameter extending through the second screw, through the mandrel and through the stabilizer rod, and further comprises an air ring, a water-cooled vessel, a pinch roll, and a product take-up device.

(Production of the Thin Multi-Layer Laminate Tube by the Tapered Core Method)

A powdery resin of an ultra-high molecular polyethylene [η]: 14.0 dl/g, MFR: smaller than 0.01 g/10 min, m.p.: 136° C., bulk density: 470 kg/m$^3$) was used as the ultra-high molecular polyolefin. A joint portion (J1) of the extruder 1 for the ultra-high molecular polyethylene shown in FIG. 1, a base portion (D1) of screw die, an inlet (D2) of outer die, and an end (D3) of outer die were set at temperatures of 200° C., 180° C., 170° C. and 165° C., respectively. The revolving speed of the first screw in the extruder 1 was set to be 50 min$^{-1}$, and the revolving speed of the second screw in the screw die was set to be 0.2 min$^{-1}$.

As the thermoplastic resin, furthermore, there was used a pelletized resin of a low-density polyethylene (MFR: 2.1 g/10 min, m.p.: 120° C., density: 920 kg/m$^3$). A joint portion (J2) between the extruder 2 and the outer die was set at a temperature of 220° C., and the revolving speed of the third screw in the extruder 2 was set to be 30 min$^{-1}$. The take-up speed of the pinch roll was set at a speed of as low as about 0.5 m/min. While taking up the multi-layer laminate that is obtained, the tapered core was fixed in the multi-layer laminate. Thereafter, the take-up speed of the pinch roll was increased up to 1.5 m/min. While taking up the multi-layer laminate, the air was blown into the multi-layer laminate from the gas passage of 6 mm in diameter that is extending through the second screw, through the mandrel and through the shaft on which the tapered core was mounted, in order to stabilize the production. Thus, there was stably obtained a thin multi-layer laminate tube of the ultra-high molecular polyethylene/low-density polyethylene having a folding width of 170 mm and a thickness of 110 μm based on the tapered core method.

Example 4

Tapered Core Method

A thin ultra-high molecular polyethylene/a low-density polyethylene multi-layer laminate tube was molded based on the tapered core method under the conditions of Example 3 but using an ultra-high molecular polyethylene having [η] of 8.2 dl/g.

Example 5

Tapered Core Method

A thin ultra-high molecular polyethylene/a low-density polyethylene multi-layer laminate tube was molded based on the tapered core method under the conditions of Example 3 but using an ultra-high molecular polyethylene having [η] of 8.2 dl/g, and under the conditions of:

outer diameter of tapered core: 220 mm length of tapered core: 735 mm take-up speed of pinch roll: 0.8 m/min.

Comparative Example 1

It was attempted to mold a film having a thickness of 50 μm under the conditions of Example 2, but selecting the total length of the length of the second screw and the length of the mandrel to be 200 mm, selecting L/D of the second screw to be 2.0, and selecting L/D of the mandrel to be 2.0. However, since flight marks due to the second screw did not disappear, the elongation of the obtained multi-layer laminate was too bad to obtain a film.

Comparative Example 2

It was attempted to mold a film having a thickness of 30 μm by using, as the thermoplastic resin, a commercially available high-density polyethylene ([η]: 3.2 dl/g, MFR: 0.03 g/10 min, density: 950 kg/m$^3$) under the conditions of Example 1, but setting the temperatures of the extruder 2 and the joint portion (J2) to be 210° C. and 200° C., respectively. However, since the melt viscosity of the resin was low, the multi-layer laminate was caught by the revolution of the mandrel, rotated together, and was twisted, making it difficult to stably mold the film.

Comparative Example 3

A skived film (manufactured by Sakushin Kogyo Co.) skived from a billet (press-molded wood-like material) obtained from an ultra-high molecular polyethylene having [η] of 14.4 dl/g was examined for its tensile strength. The tensile strength was 55 MPa in the machine direction (MD) and was 54 MPa in the transverse direction (TD).

Example 6

A thin ultra-high molecular polyethylene/modified low-density polyethylene multi-layer laminate tube was molded by using, as the thermoplastic resin, a low-density polyethylene having MFR of 1.8 modified with an unsaturated carboxylic acid (grafted amount=0.22, maleic acid anhydride/low-density polyethylene=0.22/100) under the conditions of Example 3. Then, the laminate and a steel member having a thickness of 0.2 mm were melt-adhered together by using a 50-ton press molding machine under the conditions of a temperature of 130° C. and a pressure of 10 MPa.

In the above-mentioned Examples and Comparative Examples, various properties were measured under the following conditions:

(1) Limiting viscosity [η]: measured in decalin at 135° C.

The limiting viscosity [η] of the ultra-high molecular polyethylene in the molded product was measured in a manner as described below. That is, the multi-layer laminate extruded from the outer die was neither expanded for its diameter nor vertically stretched but was cooled. Then, an ultra-high molecular polyethylene portion was peeled off by using a blade and was measured.

(2) Values of tensile strength (MD: machine (vertical) direction) and tensile strength (TD: transverse (lateral) direction) are those of tensile strength (TS: MPa) obtained under the following conditions:

Tensile test: test piece shape, JIS K6781

Gap between chucks: 86 mm

Tension speed: 200 mm/min.

Temperature: 23° C.

(3) Thicknesses of the films are values (μm) measured under the following conditions:

Measuring device: Digi-Thickness Tester manufactured by Toyo Seiki Co. Detection ability: 1 μm (detection precision, 2 μm)

Measuring method: The laminate tube was measured at 10 to 40 points maintaining an equal distance in the circumferential direction (TD), and an average thickness was found. Concretely, thickness was measured at 32 points in Examples 1 and 2, and at 10 points in Examples 3 to 6.

Standard: JIS Z1702

Pushing rod: 5 mm in diameter

Load: 125 g

Measuring pressure: 0.637 kg/cm$^2$

Temperature: 23° C.

(4) Shock resistance

By using a film shock tester manufactured by Toyo Seiko Co., the shock resistance was found under the conditions of a volume of 2.9J, shock head of a sphere of 1 inch in diameter, and an inner diameter for holding the test piece of 50 mm in diameter.

(5) Heat-sealing strengths were obtained under the following conditions:

Heat-sealing device: Sealer manufactured by Tester Sangyo Co.

Shape of testing piece: short strip 15 mm wide

Distance between the chucks: 30 mm

Tensile speed: 300 mm/min

Temperature: 23° C.

Sealing temperature: 130° C.

Two test pieces were overlapped on upon the other so that the thermoplastic resins were on the inner sides, and were heat-sealed together to test the peeling strength.

(6) The peeling strengths were obtained under the following conditions.

Melt-adhering condition:
Opposing material: steel having a thickness of 0.2 mm
50-Ton press-molding machine:
Temperature: 130° C.
Pressure: 20 MPa
Time: 10 min.
Conditions for measuring the peeling strength:
Shape of test piece: short strip 10 mm wide
Distance between the chucks: 30 mm
Tensile speed: 300 mm/min
Temperature: 23° C.

(7) Coefficient of plane orientation "fa".

A plurality of multi-layer laminates were superposed one upon the other so that the total thickness of the superposed laminates was about 2 mm, and were cut into a size of about 1 mm×5 mm. The samples were so set that the direction (vertical direction) in which the multilayer laminates were superposed was in agreement with a reference (Z) axis, and a relationship between the azimuthal angle of the plane (200) and the intensity of the X-ray was found based on the X-ray analysis, and the coefficient of plane orientation "fa" was found by calculation from the results based upon a method disclosed in "X-Ray Analysis of High Molecules (Vol. 1)" (first edition, Kagaku Dojin, by Leroy E. Alixander, 1973, p. 226).

(8) Coefficient of axial orientation "fc".

Samples measuring 1 cm×1 cm were cut out from the multi-layer laminate, and were set in a manner that the MD direction (direction of extrusion) was in agreement with the reference (Z) axis, in order to find a relationship between the azimuthal angles of the planes (110), (200) and the intensity of the X-ray relying upon the X-ray analysis. The coefficient of axial orientation "fc" was calculated from the results based on the method disclosed in "X-Ray Analysis of High Molecules (Vol. 1)" (first edition, Kagaku Dojin, by Leroy E. Alixander, 1973, p. 226).

The data of Examples and Comparative Examples were as shown in Table 1.

TABLE 1

| Evaluation items | Examples | | | | | | Comparative Examples | | |
|---|---|---|---|---|---|---|---|---|---|
| | 1 | 2 | 3 | 4 | 5 | 6 | 1 | 2 | 3 |
| Ultra-high molecular PE (starting material) | | | | | | | | | |
| [η] (dl/g) | 14.0 | 14.0 | 14.0 | 8.2 | 8.2 | 14.0 | 14.0 | 3.2 | 14.0 |
| Tm (° C.) | 135 | 135 | 135 | 135 | 135 | 135 | 135 | 135 | 135 |
| Thermoplastic resin | | | | | | | | | |
| MFR (g/10 min) | 2.1 | 2.1 | 2.1 | 2.1 | 2.1 | 1.8*[1] | 2.1 | 2.1 | — |
| Tm (° C.) | 120 | 120 | 120 | 120 | 120 | 120 | 120 | 120 | 120 |
| Total length of second screw and mandrel (mm) | 1075 | 1075 | 880 | 880 | 880 | 880 | 200 | 1075 | — |
| Inner diameter at the end of outer die (mm) | 50 | 50 | 100 | 100 | 100 | 100 | 50 | 50 | — |
| Inner diameter at the end of mandrel (mm) | 46 | 46 | 94 | 94 | 94 | 94 | 46 | 46 | — |
| Revolving speed of first screw (min$^{-1}$) | 15 | 7.5 | 50 | 50 | 50 | 50 | 7.5 | 15 | — |
| Revolving speed of second screw (min$^{-1}$) | 5 | 2.5 | 0.2 | 0.2 | 0.2 | 0.2 | 2.5 | 5 | — |
| Revolving speed of third screw (min$^{-1}$) | 10 | 5 | 30 | 30 | 30 | 30 | 5 | 10 | — |
| Take up speed of pinch roll (m/min) | 4.1 | 1.3 | 1.5 | 1.5 | 1.1 | 1.5 | 1.3 | 4.1 | — |
| Inflation ratio (times) | 8.0 | 8.0 | 1.1 | 1.1 | 2.2 | 1.1 | — | 8.0 | — |
| Vertical stretching ratio (times) | 10.9 | 7.1 | 24 | 24 | 17 | 24 | — | 10.9 | — |
| Thickness (average) (μm) | 30 | 50 | 130 | 130 | 80 | 130 | — | — | 130 |
| Tensile strength (MD) (Mpa) | 235 | 215 | 100 | 85 | 85 | 100 | — | — | 55 |
| Tensile strength (TD) (Mpa) | 165 | 145 | 55 | 50 | 60 | 55 | — | — | 54 |
| Shock resistance (KJ/m) | 88 | 83 | — | — | — | — | — | — | 32 |
| Heat-sealing strength (N/width of 15 mm) | 86 | 85 | 80 | 80 | 85 | — | — | — | not melt-adhered |
| Coefficient of axial orientation fa | — | — | 0.15 | 0.15 | 0.40 | 0.15 | — | — | 0 |
| Coefficient of plane orientation fc | 0.40 | 0.32 | — | — | — | — | — | — | — |
| Peeling strength (N/width of 10 mm) | — | — | — | — | — | 100 | — | — | — |
| Ultra-high molecular PE in the laminate [η] L (dl/g) | 8.6 | 8.0 | 11.5 | 7.8 | 7.8 | — | — | — | 13.5 |
| Molding method | inflation method | inflation method | tapered core method | tapered core method | tapered core method | tapered core method | inflation method | inflation method | skived film |

*[1]: grafted amount = 0.22

What is claimed is:

1. An inflation film comprising a multi-layer laminate comprising at least two layers, said multi-layer laminate comprising:

(A) an oriented layer of an ultra-high molecular weight polyolefin having a limiting viscosity η of not smaller than 5 dl/g; and (B) a layer of a thermoplastic resin having a melting point which is lower than that of said ultra-high molecular weight polyolefin by not less than 5° C. as measured by a DSC method wherein said multi-layer laminate has a coefficient of plane orientation "fa" of from 0.20 to 0.60 and a coefficient of axial orientation "fc" of from 0.05 to 0.60, as measured by an X-ray diffraction method.

2. The multi-layer laminate according to claim 1, wherein at least either one of an outermost layer and an innermost layer is said layer (B).

3. The multi-layer laminate according to claim 1, wherein the ultra-high molecular weight polyolefin in said oriented layer (A) is an ultra-high molecular weight polyethylene.

4. The multi-layer laminate according to claim 1, wherein the thermoplastic resin in said layer (B) is at least one selected from a group consisting of an ethylene/α-olefin copolymer, a low-density polyethylene, an ethylene/vinyl acetate copolymer, an ethylene/(meth)acrylic acid copolymer, an ethylene/(meth)acrylic acid ester copolymer, an aromatic vinyl compound/ethylene/butylene block copolymer, and an aromatic vinyl compound/ethylene/propylene block copolymer.

5. The multi-layer laminate according to claim 1, wherein the thermoplastic resin in said layer (B) is at least partly modified with an unsaturated carboxylic acid or a derivative thereof.

6. The multi-layer laminate according to claim 1, further comprising a metal layer (C).

7. The multi-layer laminate according to claim 1, wherein said multi-layer laminate has a tubular shape.

8. A process for producing a multi-layer laminate having an oriented layer of an ultra-high molecular weight polyolefin comprising:

melt-extruding an ultra-high molecular weight polyolefin having a limiting viscosity η of not smaller than 5 dl/g into a screw die equipped with a second screw by using an extruder equipped with a first screw;

extruding a melt of the ultra-high molecular weight polyolefin extruded in the screw die into an annular outer die provided at an upper end of the screw die by using the second screw;

passing the melt of the ultra-high molecular weight polyolefin extruded into the outer die through an annular resin passage which upwardly extends being formed by an outer surface of a mandrel that is provided at an upper end of the second screw and revolves together with the second screw and by an inner surface of the outer die, and extruding a melt of a thermoplastic resin having a melting point which is lower than that of said ultra-high molecular weight polyolefin by not less than 5° C. as measured by a DSC method into an upper portion in said annular resin passage so as to meet a flow of the melt of the ultra-high molecular weight polyolefin, thereby to form a tubular laminate; and upwardly taking up said tubular laminate extruded from the upper end of the outer die while inflating and vertically stretching said tubular laminate.

9. The process for production according to claim 8, wherein a ratio (Ls/Ds) of the inner diameter (Ds) of an outlet of the screw die to the length (Ls) of said second screw is set to be not smaller than 1.5, and a ratio (Lm/Dm) of the inner diameter (Dm) of an inlet of the outer die to the length (Lm) of the mandrel is set to be from 4 to 70.

10. The process for production according to claim 8, wherein, when the inner diameter at the upper end of the outer die is denoted by Dn, the melt of said thermoplastic resin and the melt of said ultra-high molecular weight polyolefin are caused to meet together at a position maintaining a distance of Dn/5 to 50Dn on the upstream side of the resin passage from the upper end of the outer die.

11. The process for production according to claim 8, wherein a melt of another thermoplastic resin is supplied into said annular resin passage and is caused to meet on the down stream side of a position where the melt of said thermoplastic resin and the melt of said ultra-high molecular weight polyolefin meet together.

12. The process for production according to claim 8, wherein said ultra-high molecular weight polyolefin is an ultra-high molecular weight polyethylene.

13. An apparatus for producing a laminate having an oriented layer of an ultra-high molecular weight polyolefin, comprising an extruder equipped with a first screw, a vertical screw die provided at an end of said extruder and is equipped with a second screw, and an annular outer die provided at an upper end of said vertical screw die, wherein a melt of an ultra-high molecular weight polyolefin having a limiting viscosity η of not smaller than 5 dl/g is extruded by the first screw into the screw die from the extruder, the melt of the ultra-high molecular weight polyolefin in said screw die is extruded by the second screw out of the outer die through the outer die, and an extruded tubular molded article in a molten state is inflated, vertically stretched, and is taken up; wherein a mandrel penetrates through an annular space of said outer die, said mandrel being coupled to an upper end of said second screw and revolving together with said second screw;

a gas passage is extending from the lower end of said second screw passing through said mandrel;

an introduction port is formed in a side surface of an annular resin passage formed by the inner surface of the outer die and the outer surface of the mandrel for supplying a melt of a thermoplastic resin other than said ultra-high molecular weight polyolefin, the melt of said thermoplastic resin is supplied into the annular resin passage through said introduction port, so that a layer of said melt of said ultra-high molecular weight polyolefin and layer of said melt of said thermoplastic resin meet together to form a tubular multi-layer laminate; and said tubular multi-layer extruded from the upper end of the outer die is inflated by a gas blown from said gas passage at the upper end of said mandrel.

14. The apparatus for production according to claim 13, wherein the introduction port for introducing the thermoplastic resin is a crosshead die portion formed in the outer die.

15. The apparatus for production according to claim 13, wherein introduction ports for introducing the thermoplastic resin are formed at plural places.

16. The apparatus for production according to claim 13, wherein a ratio (Ls/Ds) of the inner diameter (Ds) of an outlet of the screw die to the length (Ls) of said second screw is set to be not smaller than 1.5, and a ratio (Lm/Dm) of the inner diameter (Dm) of an inlet of the outer die to the length (Lm) of the mandrel is set to be from 4 to 70.

17. The apparatus for production according to claim 13, wherein, when the inner diameter at the top end (outlet) of the outer die is denoted by Dn, the introduction port for introducing said thermoplastic resin is located at a distance of Dn/5 to 50Dn on the upstream side of the resin passage from the upper end of the outer die.

18. The apparatus for production according to claim 13, wherein said annular resin passage satisfies the conditions determined by the following formulas (i) and (ii):

$$S1/S2 = 0.5 \text{ to } 3.0 \quad \text{(i)}$$

$$S2/S3 = 2.0 \text{ to } 10.0 \quad \text{(ii)}$$

wherein S1 is a sectional area of the resin passage in the inlet of the outer die, S2 is a sectional area of the resin passage at an intermediate point between the inlet of the outer die and said introduction port, and S3 is a sectional area of the resin passage at said introduction port.

* * * * *